March 24, 1959  E. C. WORDEN  2,879,472
DYNAMIC RESISTANCE RECORDER
Filed Oct. 11, 1957

INVENTOR
Edgar C. Worden

BY
ATTORNEYS

2,879,472

DYNAMIC RESISTANCE RECORDER

Edgar C. Worden, Cedar Grove, N.J., assignor to the United States of America as represented by the Secretary of the Interior Application October 11, 1957, Serial No. 689,689

5 Claims. (Cl. 324—62)

(Granted under Title 35, U. S. Code (1952), sec. 266)

This invention herein described and claimed, may be manufactured and used by or for the Government of the United States of America, for governmental purposes without the payment of any royalties thereon or therefor.

The present invention relates to the continuous recording of the resistance of an electrical load, as determined by an automatically balanced electrical bridge.

While the invention will be described with specific reference to measuring the resistance of a mineral melt, it is to be understood that the invention may be applied to other electrical loads in widely varied organizations without departing from the spirit or scope of the appended claims.

In connection with the preparation of synthetic mica, as disclosed in U.S. Patent 2,711,435 issued June 21, 1955, it is necessary to measure and record the resistance of the melt. This can be done by measuring the voltage across, and the current through the melt and calculating the resistance according to Ohm's law. However, this method of necessity is periodic and does not reveal interim changes. In addition it depends on the simultaneous reading of two meters, which is difficult to perform with accuracy.

The resistance of the melt is a function of various factors, such as the length of the melt, its cross sectional area, temperature, additions of materials to the melt, heat dissipated from the melt, etc. Especially during the early stages of melting, the resistance may change more than ten-fold very rapidly. Under conditions of rapidly changing voltage and amperage, it is practically impossible to obtain accurate simultaneous meter readings.

It is an object of this invention to provide a system for continuously measuring the resistance of a changing electrical load.

It is a further object of this invention to provide a circuit including a self-balancing bridge wherein the voltage in one arm is proportional to the voltage across the load, and the current in an adjacent arm is proportional to the current through the load.

Further objects of the invention will become apparent from the following description taken in connection with the accompanying drawings wherein.

The invention consists of a self-balancing bridge circuit having four arms for continuously measuring the resistance of a load. One arm of the bridge has a voltage proportional to the voltage through the load, the adjacent arm has a current proportional to the current through the load, a third arm is fixed resistance, and the fourth arm consists of a potentiometer employed as a rheostat connected to a servo-mechanism, which acts automatically to balance said bridge. The balancing movement of the slide arm of the potentiometer may be communicated to a recorder so as to form a continuous chart of the load resistance changes. While the invention gives substantially instantaneous information as to the resistance of any electrical load of near unity power factor, it can be adjusted to compensate for any power factor of a fixed value.

Figure 1:
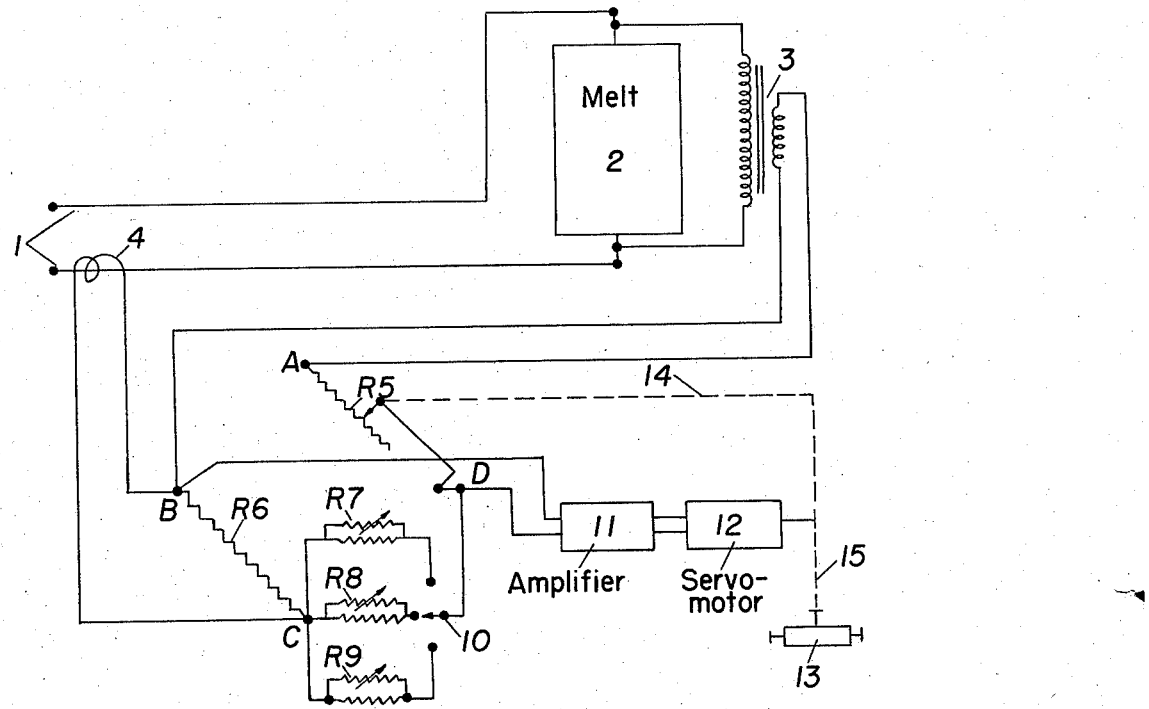
Fig. 1 shows the circuit diagram of the preferred form of the invention with certain portions shown schematically.

Referring to Figure 1, A.C. current from lines 1 is supplied to a melt 2. Voltage across the melt is led to the primary of isolating voltage transformer 3. The stepped-down voltage of the secondary of transformer 3, is led to an electrical bridge network, introducing a voltage in one arm AB of the bridge which is proportional to the voltage across the melt.

Current transformer 4, having an appropriate current rating, is inserted in series with the current through the load. Across the secondary of transformer 4 is placed a resistor, designated R6, developing a voltage which is proportional to the current through the melt. This voltage is led to a second arm BC of the bridge, and is so placed that the voltages are additive. Thus, the numerical sum of the voltages in arms AB and BC appears between points A and C. Arm CD of the bridge is a fixed resistor. Resistors R7, R8, and R9 of different ranges may be selected by switch 10. Each of said resistors is shunted by a small variable resistor, so that the resistance may be adjusted. The fourth arm AD of the bridge consists of a high accuracy, multi-turn voltage divider R5 used as a rheostat or variable resistance. The output of the bridge is from points B and D. When the bridge is balanced no voltage difference exists between B and D, and the equation $$\frac{AB}{BC} = \frac{AD}{DC} \tag{1}$$

is fulfilled.

Since the voltage in AB ($E_{ab}$) is proportional to the voltage across the melt ($E_m$), $$E_{ab} \alpha E_m \text{ or } E_{ab} = k_1 E_m \tag{2}$$

where $k_1$ and the succeeding $k_s$ are constants. The voltage in BC ($E_{bc}$) is proportional to the current through the melt $$(I_m), E_{bc} \alpha I_m \text{ or } E_{bc} = k_2 I_m \tag{3}$$

Therefore $$\frac{AB}{BC} = \frac{k_1 E_m}{k_2 I_m} = k_3 R_m \tag{4}$$

where R is the resistance of the melt.

$$\frac{AD}{DC} = \frac{R_5}{R_7, R_8 \text{ or } R_9} \tag{5}$$

and since the resistances in the denominator are constants $$\frac{AD}{DC} = k_4 R_5 \tag{6}$$

Substituting (4) and (6) in Equation 1, $k_3 R_m = k_4 R_5$ or at balance $$R_m = k_5 R_5 \tag{7}$$

Should a voltage unbalance exist at points B and D, it is amplified by amplifier 11 to activate one winding of a two-phase servo-motor, the second winding of which is continuously energized from a source of the same frequency and phase as the power supplied to the melt. The servo-motor is mechanically linked via means 14 and 15 shown schematically to drive the voltage divider R5 and to position the pen of recorder 13. The phase relation of the signal from B and D to the A.C. power source determines the direction of rotation of the motor, and is so arranged as to drive R5 in a direction as will bring the bridge into balance.

Figure 2:
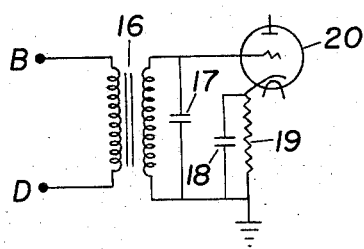
Fig. 2 shows the input circuit to the amplifier.

The amplifier is of the conventional type generally used in servo-mechanism employed in temperature measuring potenitometers, strain gages, etc. Since any unbalance in potential occurring at B and D consists of alternating current, the conventional "chopper" is not required. Figure 2 shows the input circuit to the amplifier employed instead of the "chopper." Capacitor 17 is chosen to resonate the secondary of transformer 16 to power frequency, thus giving the greatest possible voltage at this frequency and attenuating the voltage at other frequencies. Elements 18, 19 and 20 are conventional components of the amplifier circuit included to show the connection of the transformer to the amplifier circuit.

Having now described our invention, what I claim as new and desire to secure by Letters Patent is:

1. An electrical bridge for measuring the resistance of a load having an A.C. current flowing therethrough, comprising a first variable resistance included in one of the ratio arms of said bridge, a fixed second resistance in an adjacent arm of said bridge, inductive means for sensing the current through the load, circuit means for applying said sensed current through a third resistance arm in said bridge to develop a voltage proportional to the current through the load, means for sensing voltage across said load, circuit means for impressing said sensed voltage on a fourth arm of said bridge, amplifying means for amplifying the bridge signal, means responsive to said amplified signal for automatically varying the setting of the first variable resistance to balance said bridge.

2. An electrical bridge for measuring the resistance of a load having an A.C. current flowing therethrough, comprising a first variable resistance included in one of the ratio arms of said bridge, a fixed second resistance in an adjacent arm of said bridge, inductive means for sensing the current through the load, circuit means for applying said sensed current through a third resistance arm in said bridge to develop a voltage proportional to the current through the load, means for sensing voltage across said load, circuit means for impressing said sensed voltage on a fourth arm of said bridge, amplifying means for amplifying the bridge signal, means responsive to said amplified signal for automatically varying the setting of the first variable resistance to balance said bridge, and means for recording the amount of variable resistance variation, the latter being proportional to the instantaneous resistance of the load.

3. An electrical bridge for measuring the resistance of a load having an A.C. current flowing therethrough, comprising a first variable resistance included in one of the ratio arms of said bridge, a fixed second resistance in an adjacent arm of said bridge, inductive means for sensing the current through the load, circuit means for applying said sensed current through a third resistance arm in said bridge to develop a voltage proportional to the current through the load, and transformer means in shunt with said load having primary and secondary windings, said secondary winding serving as the fourth arm of said bridge, and means controlled by the signal from the bridge for varying the setting of the first variable resistance to restore the balance of the bridge.

4. An electrical bridge for measuring the resistance of a load having an A.C. current flowing therethrough, comprising a first variable risestance included in one of the ratio arms of said bridge, a fixed second resistance in an adjacent arm of said bridge, inductive means for sensing the current through the load, circuit means for applying said sensed current through a third resistance arm in said bridge to develop a voltage proportional to the current through the load, and transformer means in shunt with said load having primary and secondary windings, said secondary widing serving as the fourth arm of said bridge, amplifying means for amplifying the bridge signal, means responsive to said amplified signal for automatically varying the setting of the first variable resistance to balance said bridge.

5. An electrical bridge for measuring the resistance of a load having an A.C. current flowing therethrough, comprising a first variable resistance included in one of the ratio arms of said bridge, a fixed second resistance in an adjacent arm of said bridge, inductive means for sensing the current through the load, circuit means for applying said sensed current through a third resistance arm in said bridge to develop a voltage proportional to the current through the load, and transformer means in shunt with said load having primary and secondary windings, said secondary winding serving as the fourth arm of said bridge, and means for recording the amount of first variable resistance variation, the latter being proportional to the instantaneous resistance of the load.

References Cited in the file of this patent

UNITED STATES PATENTS

| 1,917,417 | Zuschlag(A) | July 11, 1933 |
| 1,997,164 | Zuschlag(B) | Apr. 9, 1935 |
| 2,198,371 | Wolferz et al. | Apr. 23, 1940 |
| 2,772,395 | Runaldue et al. | Nov. 27, 1956 |

UNITED STATES PATENT OFFICE

Certificate of Correction

Patent No. 2,879,472                                                                  March 24, 1959

Edgar C. Worden

It is hereby certified that error appears in the printed specification of the above numbered patent requiring correction and that the said Letters Patent should read as corrected below.

Column 2, line 37, Equation 2, for that portion of the equation reading "$E_{ab} \alpha E_m$" read —$E_{ab} \propto E_m$—; line 40 for "$k_s$" read —$k$'s—; line 43, Equation 3, for that portion reading "$E_{bc} \alpha I_m$" read —$E_{bc} \propto I_m$—.

Signed and sealed this 10th day of November 1959.

[SEAL]

Attest:

KARL H. AXLINE,

Attesting Officer.

ROBERT C. WATSON,

Commissioner of Patents.